United States Patent [19]

Mandel et al.

[11] Patent Number: 5,752,697
[45] Date of Patent: May 19, 1998

[54] REMOTE PRINTING JOB CONFIDENTIALITY

[75] Inventors: Barry P. Mandel, Fairport; Terrence D. Charland, Wolcott, both of N.Y.

[73] Assignee: Xerox Corporation, Stamford, Conn.

[21] Appl. No.: 659,551

[22] Filed: Jun. 6, 1996

[51] Int. Cl.[6] .................................................. B65H 39/10
[52] U.S. Cl. .......................... 271/288; 271/298; 270/58.18
[58] Field of Search .............................. 271/288, 298, 271/258.01, 259; 270/58.03, 58.18, 52.03; 399/21, 18, 23, 405

[56] References Cited

U.S. PATENT DOCUMENTS

| | | | |
|---|---|---|---|
| 5,144,222 | 9/1992 | Herbert | 323/271 |
| 5,157,448 | 10/1992 | Lang | 355/309 |
| 5,270,773 | 12/1993 | Skluet et al. | 355/201 |
| 5,328,169 | 7/1994 | Mandel | 271/298 X |
| 5,328,170 | 7/1994 | Coombs et al. | 271/297 |
| 5,464,200 | 11/1995 | Nakazato et al. | 270/53 |
| 5,505,442 | 4/1996 | Chang et al. | 271/298 |

Primary Examiner—David H. Bollinger

[57] ABSTRACT

In a shared users printing and mailboxing system, with a shared remote printer with an operatively connecting array of lockable mailboxes, in which system electronic print jobs from different users at different locations may be electronically sent to be printed, which hardcopy print jobs are automatically fed into respective selected lockable mailboxes, wherein the printer has an internal paper path for this printing with sheet jam clearance capability and a system for signaling a sheet jam, and at least one openable printer access door providing access to the paper path for jam clearances; a print job security improvement system with an automatic locking system for electronically locking the printer access door and an access door on the mailboxing system during printing of security sensitive print jobs to prevent access to the internal printer paper path, but automatically unlocking the printer access door after the hardcopies have reached the selected mailboxes if there is no sheet jam signal, and maintaining the printer access door locked if there is a sheet jam in the paper path until the automatic locking system is actuated by entry of an authorized jam clearance access code.

4 Claims, 1 Drawing Sheet

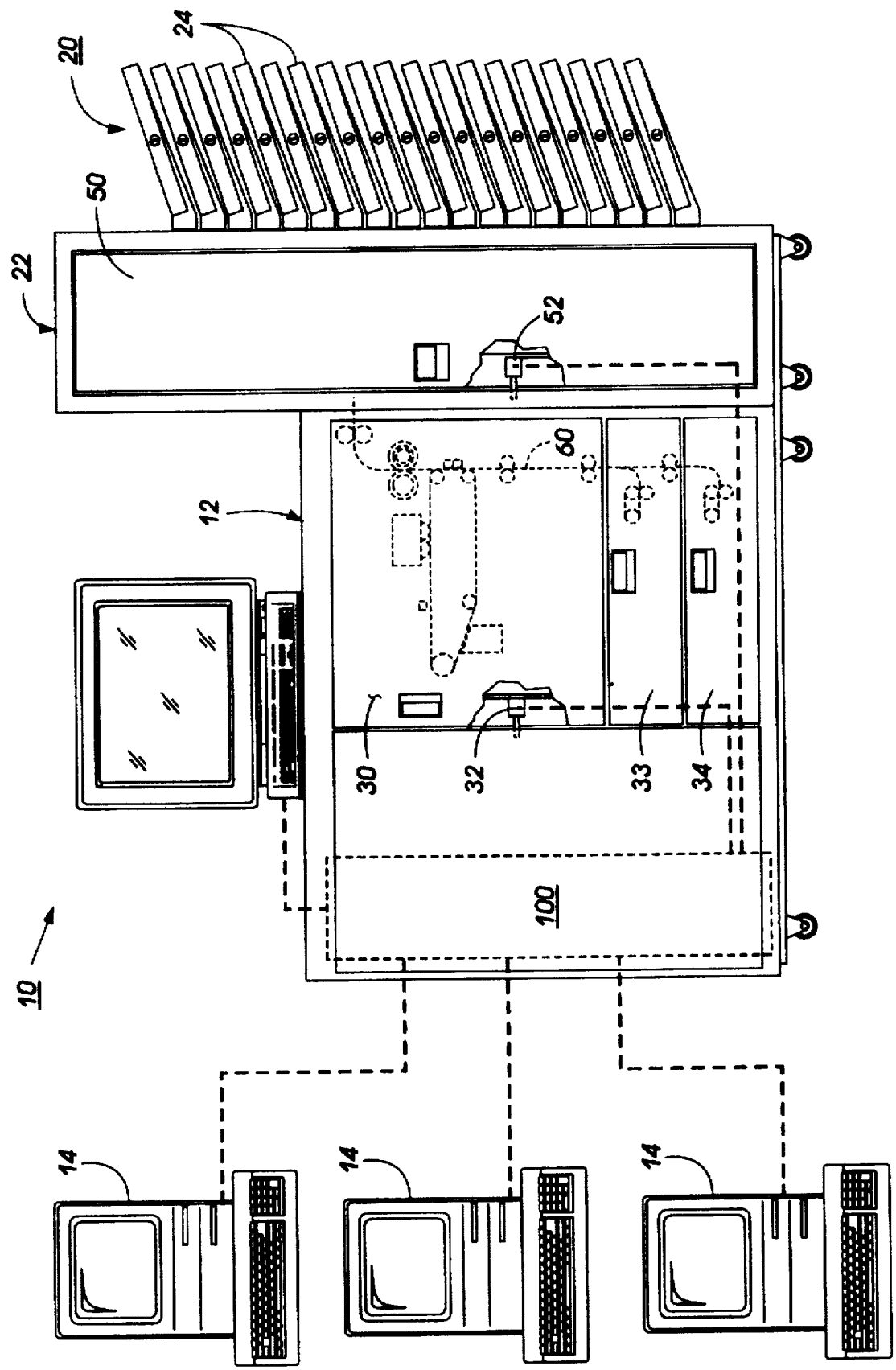

REMOTE PRINTING JOB CONFIDENTIALITY

Disclosed herein is a system for improving the confidentiality of printing of documents in a remote printing system.

As discussed in the below-cited Xerox Corporation U.S. Pat. No. 5,308,058 to B. Mandel, et al., and other cited or related patents, it is well known to provide remote shared user printing and mailboxing systems in which the various users can send their electronic print jobs from different locations to be printed at the shared remote printer, and these hard copy print jobs generated in the printer are then automatically fed from the printer into respective elected or assigned lockable mailboxes, to be temporarily stored therein until the subsequent unlocking of the mailboxes by those users for the pickup of their hard copy print jobs. Such known mailboxing systems can automatically stack the respective print jobs of respective users of the printers into designated mailbox bins designated for the respective users, so that those print jobs are secured from reading or removal by other users. Such mailbox bins may be unlockable electronically by entry of a unique access code for a particular user or group of users and/or a system administrator.

However, it has been found that there are situations in which such a secured printing system is compromised, and unauthorized other persons can see and read at least part of the documents intended to be securely locked in the mailbox bins. This can occur when a jam occurs in the paper path of the printer itself. Anyone opening the covers of the printer to clear the jam can view sheets in the process of being printed, and in clearing the jam may well dispose of such sheets into an open wastebasket or other non-confidential manner such that anyone can read the documents. Such documents may contain highly confidential business or personnel information or descriptions of secret new technology or other sensitive information.

As is well-known, such paper feeding jams are still a relatively frequent occurrence in xerographic or other printers, particularly with varying conditions of the copy paper, humidity, etc.. For that reason, it is not practical to keep the access doors or covers of the printer which provide access to the printer paper path for jam clearance locked electrically or mechanically all of the time. For normal printing operations, these machine covers need to be readily openable by the various individuals using the printer to keep it running, as well as for key operators and tech reps providing service for the machine.

The machine covers or doors providing access to the paper path of the printer should not be confused with the separate drawers or doors providing access to other parts of the machine such as the photoreceptor area or fuser areas, which can be kept locked except for tech rep access for safety or other reasons, such as the locked doors in the processor part of some Oce' Van der Grinten copiers, which cover those parts of the machine other than the paper path access. Likewise, most printers have separate drawers for loading paper sheets into the machine for printing. Such paper drawers may be locked during sheet feeding from those paper drawers to prevent sheets in the process of being fed from the drawer from being torn or jammed by the drawer being pulled out at that time. See, especially, Xerox Corporation U.S. Pat. No. 5,157,448 issued Oct. 20, 1992 to Joseph H. Lang.

Xerox Corporation U.S. Pat. No. 5,270,773 issued Dec. 14, 1993 to Robert L. Sklut and Thomas Acquaviva provides a different approach in which a copier or printer determines the presence of output from a previous job and enables a purge from the paper path of existing sensitive documents or electronic images, or prevents operation, until an authorized operator initiates a purge. The purge may be into a locked output bin or wastebox. However, that system assumes that the jam was not a true or hard stop jam, since it requires the paper path to be operative to feed the sheets into the secure purge location. As is well known, many paper jams cause stoppage of the printer with several sheets caught in the paper path and the machine cannot be restarted in such cases until jammed sheets have been removed from the paper path . I.e., a full purge is not possible for such jams. Said U.S. Pat. No. 5,270,773 logs a security violation when an operator leaves the machine with paper in it. Of particular interest, said U.S. Pat. No. 5,270,773 indicates in Col. 4, lines 10–13 that "due to the nature of the system, access to the paper path requires either an approved operator log in or a special key". Lines 36–43 indicate that . . . "if the operator attempts to terminate their session while a manual intervention jam clearance is required, step 600, such that an automatic purge cycle is not possible (i.e., the approved system operator would have to unlock some secured hardware or access panel in the machine to manually remove output), it is recommended to have the operator request this jam clearance (step 601) prior to their log out period". This presupposes that the "approved system operator" is available. Col. 4, line 65 to the top of Col. 5 indicates that to be effective, machines equipped with such a purge security feature require locked access panels covering the entire paper path. It indicates that such machines should have unique keys to access their inner paper path components or possess alternative locking mechanisms under the supervision of the machine's access rights control system. However, this patent does not appear to provide further details or explanation of how this is to be accomplished.

In contrast, in the disclosed embodiment herein, the print job itself, and optionally also an associated electronic signal indicating a "secure" job, only normally locks the access panels to the paper path intermittently briefly during the time in which such secure print job sheets are in the paper path of the printer and have not yet entered the locked bins of a mailboxing system, unless a jam occurs.

As to hardware examples, it will be appreciated that any of various solenoid or electric motor actuated or other electronic locks may be employed, of which some examples are already provided in the above-cited Xerox Corp. U.S. Pat. No. 5,157,448 and 5,308,058.

Additional art with lockable bins which are electronically unlockable by access codes or cards include EPO Publication No. 0 241 273 published Oct. 14, 1987, Xerox Corporation Docket No. 86031 EP; Seiko Epson Corporation U.S. Pat. No. 5,144,222; and Gradco U.S. Pat. No. 5,328,170; and also U.S. Pat. No. 5,464,200, issued Nov. 7, 1995 to Yasushinakazato et al. and U.S. Pat. No. 5,505,442 issued Apr. 9, 1996 to J. Chang, et al.

The disclosed embodiment feature of a security document or secure job designator may utilize existing security access designator codes entered by the user on the user's PC or other terminal on which the document is generated or edited. That code may be in one of the well-known page description languages (PDL), such as Interpress™, Postscript®, Quickdraw™, or other well-known network and/or page description languages noted in Col. 17 of said U.S. Pat. No. 5,308,058 and elsewhere, and it may be on an electronic "job ticket" or job control sheet such as disclosed in U.S. Pat. Nos. 4,970,554 or 4,757,348. For example, it is known to put codes or subroutine operating instructions in the "comments" section of PDL document descriptors which are stripped out as soon as the electronic document is received by the printer for controlling queuing or printing functions.

Also noted on the subject of a sorter with an array of locked drawers or bins which may be electronically unlocked to slide out, is U.S. Pat. No. 5,328,170 issued Jul. 12, 1994 to Peter M. Coombs, et al, assigned to Gradco (Japan) Ltd.; and Ricoh Japanese Utility Model Publication No. 62-95373 of Jun. 18, 1987. An additional secured or locked array of bins system with a slide out drawers mechanism is shown in Xerox Disclosure Vol. 18, No. 6, November/December, 1993, pages 619–624.

As noted in some of the cited mailbox references, printer mailbox systems do not operate like sorters. They provide one or more assignable, designated or selected discrete mailbox bins for designated users for their printed sheets output from a shared users printer. Thus, the print jobs of different users can be separated into different bins for different users, and optionally locked therein. This is completely different from "sorting" in the usual sense of collating plural identical copy sheets by sequentially placing one such sheet at a time in a different bin, and then repeating those steps for each different copy sheet, to end up with one identical collated copy set in each bin.

To provide mailbox job security and privacy requires restricting manual access to the mailbox bins to prevent unauthorized reading or removal of the job sets in that bin until that bin is unlocked by or for that user. As shown and described in the above references, this bin unlocking is preferably by controlled selective electric unlatching of bins in response to a code entry when that particular user or a systems administrator wishes to remove print jobs from assigned mailbox bins, so that the bins may otherwise remain locked to protect their contents.

A specific feature of the specific embodiment disclosed herein is to provide, in a shared users printing and mailboxing system, with a shared remote printer with an operatively connecting array of lockable mailboxes, in which system electronic print jobs from different users at different locations may be electronically sent to be printed in said shared remote printer as hardcopy sheets print jobs, which hardcopy print jobs are automatically fed from said printer into respective selected said lockable mailboxes to be temporarily stored therein until subsequent unlocking of said mailboxes for pickup of said hardcopy print jobs; wherein said printer has an internal paper path for said printing of said hardcopy print jobs with a sheet sensing system for signaling a sheet jam in said paper path and sheet jam clearance capability, and at least one openable printer access door providing access when opened to said internal printer paper path for said printer hardcopy sheet jam clearances; a print job security improvement comprising an automatic locking system for electronically locking said printer access door for the time periods in which said electronic print jobs are being printed and hardcopies thereof are in said paper path, to prevent access to said internal printer paper path; said automatic locking system automatically unlocking said printer access door after said hardcopies of said electronic print jobs have reached said selected mailboxes if there is no said sheet jam sensing system signal; said automatic locking system maintaining said locking of said printer access door if said sheet jam sensing system is indicating that there is a sheet jam in said internal printer paper path until said automatic locking system is actuated by entry of an authorized jam clearance access code.

Further specific features disclosed herein, individually or in combination, include those in which said electronic print jobs may be selectively electronically designated as secure print jobs, wherein said openable printer access door is only locked by said automatic locking system while said electronic print jobs are being printed when said electronic print jobs being printed are so designated as a secure print job; and/or further including a hardcopy sheet distribution system between said printer and said array of lockable mailboxes, said hardcopy sheet distribution system having an access door, and further including a second automatic locking system for electronically locking said hardcopy sheet distribution system access door while said electronic print jobs are being printed until said hardcopies of said electronic print jobs have reached said selected mailboxes; and/or wherein respective said users of said system have an assigned access code for said unlocking of said mailboxes for said hard copy print jobs of said user, and wherein said printer access door is automatically electronically unlocked by entry of said access code in said automatic locking system for said sheet jam clearance from said internal paper path of said printer.

The disclosed system may be operated and controlled by appropriate operation of conventional control systems. It is well known and preferable to program and execute imaging, printing, paper handling, and other control functions and logic with signals from software instructions for conventional or general purpose microprocessors, as taught by numerous prior patents and commercial products. Such programming or software may of course vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software and computer arts. Alternatively, the disclosed control system or method may be implemented partially or fully in hardware, using standard logic circuits or single chip VLSI designs. The resultant controller signals may conventionally actuate various conventional electrical solenoid or cam-controlled sheet deflector fingers, motors or clutches, or other components, in programmed steps or sequences. Conventional sheet path sensors or switches connected to the controller may be utilized for sensing, counting, and timing the positions of sheets in the sheet paths of the reproduction apparatus, and thereby also controlling the operation of sheet feeders and gates, etc., as is well known in the art.

As to specific components of the subject apparatus, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background. What is well known to those skilled in the art need not be described here.

Various of the above-mentioned and further features and advantages will be apparent from the specific apparatus and its operation described in the example below, and the claims. Thus, the present invention will be better understood from this description of a specific embodiment, including the drawing figures (approximately to scale) wherein:

FIG. 1 shows a shared users printing and mailboxing system in accordance with the present invention in which there is schematically illustrated a number of remote users sending electronic print jobs from different remote terminal locations to a single exemplary printer which has electronically lockable access restricting doors over its internal paper path. It also shows another such lockable door over the sheet distribution system between this printer and the exemplary array of lockable and electronically unlockable mailboxes into which the hard copy sheets of the print job respective users are distributed.

Referring to this FIG. 1 Figure, it will be appreciated that the internal details of the paper path of the exemplary printer (including its conventional sheet jam sensing system) and the exemplary mailboxing sheet distribution system and mailbox bins, as well as suitable door locking mechanisms, are well known from the above and other cited art to those skilled in these arts and thus need not be described in detail herein. There is shown in this exemplary system 10 a centralized document printer 12 which is being sent electronic documents for printing from document generating terminals 14. That print jobs transmission may be over various communication networks and transmission media, as is well known. The advantages of such centralized shared printer electronic printing over small individual desktop printers are well known including much lower cost per page of printing and much faster printing by using a larger printer, and the ability to provide on-line finishing and other hard copy document features of a more sophisticated printer.

The system 10 here further includes an operatively connecting mailbox system 20 for taking the printed sheets outputted from the printer 12 into a sheet distribution system 22, and, with or without finishing, stacking the print jobs for designated users into designated mailboxes. Here, there are locked mailbox bins 24, which may be unlocked by the users of those mailboxes, as described in detail, for example, in the above-cited U.S. Pat. No. 5,308,058. The printer 12 here has its paper path 60 in the upper portion thereof, and that paper path portion (only) of the printer 12 is normally covered and access restricted by an access door 30. The access door 30 is normally freely openable here for jam clearance or maintenance, except when it is locked by a solenoid operated latching door lock 32 actuated by the controller 100 in the printer 12 by the software programmable microprocessor therein.

The portion of the mailboxing system 20 comprising the sheet distribution system 22 here also has an access door 50 which is normally openable for access. This mailboxing system sheet distribution system access door 50 is also provided with a similarly electronically actuable lock 52. (It will be appreciated that, conventionally, door interlocks may be provided for both of the doors 30 and 50 to prevent the components therein from operating when the doors are open for safety reasons, which is well known and not part of this disclosed system.)

Preferably, when normal or non-security documents are sent to the printer 12 from any of the remote document generating terminals 14, the access doors 30 and 50 may be openable without any required unlocking in the case of a jam or any other need to open such doors for clearance of the jammed sheets from the paper path. That is, preferably, only in the special situation in which a document with a security code is generated or transmitted from a terminal 14 to the printer 12, i.e., a print job with a "secure print job" electronic designation selectively applied or designated by the user to that print job, is there provided a locking signal to the controller 100 from the standard electronic input to the printer 12. This electronic locking signal, however, is not necessarily immediately applied to the solenoid locks 32 and/or 52. Rather, it need only be applied when that print job reaches the point in the electronic print queue of the printer 12 at which the actual hard copies of that print job are to be printed. At that point, when these hard copy print sheets start to pass through the printer paper path 60 (illustrated in phantom in FIG. 1), then the solenoid locks 32 and 52 are actuated to prevent anyone from opening at that point the respective access door 30 on the printer 12 and the access door 50 on the mailbox system 20.

As is well known, the paper path 60 of this or almost any printer contains sheet path sensors which detect and track the passage of the print sheets through the paper path and out of the printer 12. If no sheet jam occurs, the sensors automatically indicate that all of the hard copy sheets of a given print job have been completed and have exited the printer 12. At that point, the solenoid lock 32 for the printer access door 30 can be immediately unlocked, unless there is another immediately subsequent secure print job already in the paper path 60 at that point, in which case the access door 30 will remain locked for that subsequent secure print job as well, until that job is completed.

Alternatively, the access doors 30 and 50 can be automatically locked for all (each of the) print jobs until that print job safely reaches its assigned mailbox bin(s), not just security-coded print jobs.

The electronic lock 52 on the mailbox system access door 50 may be locked and unlocked at substantially the same time and under the same conditions as the printer access door 30, if desired. Alternatively, mailbox bins 24 may have conventional sheet sensors at the input thereof acting as sheet counters to confirm the entry into the mailbox bin 24 of the complete secure print job, which signal may then be used to keep the mailbox system access door 50 locked until the entire secure print job has been stacked inside of locked mailbox bin 24 (which may be actually more than one bin 24 in the case of large print jobs of large or multiple document sets).

To recap, in normal operation, where no jams occur in the sheet path 60 of the printer 12 or in the sheet distribution path of the sheet distribution system 22 of the mailbox system, the access doors 30 and 50 are only relatively briefly locked for the passage therethrough of print jobs sheets only during the time in which those jobs are being printed and until they are all outputted to the locked mailbox bins 24.

However, now considering the situation in which a jam occurs in the printer paper path 60. The access door 30 will remain locked by the solenoid lock 32, especially if the job in process was a designated secure print job. Although this may delay the clearance of the jam, it prevents anyone other than the user or other user-designated individuals to have access to the paper path 60 to remove any confidential documents jammed in the printer paper path 60 or the mailbox sheet distribution system 22.

However, it is not essential that the user who sent the secure print job to the printer which has jammed during printing actually be physically present at the printer. The printer may send back a message to the remote terminal of that user indicating that a jam has occurred in his or her print job. The user may then go to the printer location and key in to the printer graphic user interface (GUI) the code number, or swipe an access code card into a card reader, to unlock the printer access door 30 while that user is there to supervise recovery and disposal of the jammed sheets of the secured job. Alternatively, however, the user may send another electronic signal from his terminal or telephone to a system administrator which will instruct and/or authorize that other person to open the locked access door 30 to clear the jam of secured documents and restart the printer 12.

With a more modern, reliable, printer with relatively low jam rates, this jamming situation will occur relatively infrequently, and therefore the locking of the printer access door 30 on mailbox system access door 50 will typically not interfere with normal operations, especially where the locking of these access doors 30 and/or 50 only occurs during the printing of specially designated print jobs, not normal print jobs.

It will be appreciated that the unlocking or access code for opening the printer access door 30 and the mailbox system access door 50 to clear jams therein may be the same access code number provided to the user to unlock his designated or assigned mailbox bins 24. It may also be the same code number used by the user for billing or charge purposes such as an "Auditron" code number. Furthermore, there may be additional access numbers which will also be recognized by the controller 100 to allow a locked access door 30 to be unlocked, such as a "passkey" or master access number used by a system administrator or tech rep, unless the sensitivity of the document is such that even those personnel should not be provided access to the machines when they are operating.

It will be appreciated that door locking may be maintained without power by various mechanical latches, such as by having the door maintained locked after briefly powering a solenoid that moves a locking pin into place until such time as another brief power application to the solenoid moves the pin back to unlock the door. Another alternative would be to have a lock system that could be locked and unlocked by briefly actuating a solenoid that moves a latching mechanism back and forth between two different latching positions (such as that similar to the operation of many retractable ball point pens). Advantages of these alternatives include: (a) the door lock cannot be defeated by unplugging the printer power to remove the solenoid power, and (b) the locking system will draw less power since no solenoid maintenance current is required, thus reducing the overall power consumption of the printer.

While the embodiments disclosed herein are preferred, it will be appreciated from this teaching that various alternatives, modifications, variations or improvements therein may be made by those skilled in the art, which are intended to be encompassed by the following claims:

We claim:

1. In a shared users printing and mailboxing system, with a shared remote printer with an operatively connecting array of lockable mailboxes, in which system electronic print jobs from different users at different locations may be electronically sent to be printed in said shared remote printer as hardcopy sheets print jobs, which hardcopy print jobs are automatically fed from said printer into respective selected said lockable mailboxes to be temporarily stored therein until subsequent unlocking of said mailboxes for pickup of said hardcopy print jobs; wherein said printer has an internal paper path for said printing of said hardcopy print jobs with a sheet sensing system for signaling a sheet jam in said paper path and sheet jam clearance capability, and at least one openable printer access door providing access when opened to said internal printer paper path for said printer hardcopy sheet jam clearances, a print job security improvement comprising:

an automatic locking system for electronically locking said printer access door for the time periods in which said electronic print jobs are being printed and hardcopies thereof are in said paper path, to prevent access to said internal printer paper path, said automatic locking system automatically unlocking said printer access door after said hardcopies of said electronic print jobs have reached said selected mailboxes if there is no said sheet jam sensing system signal, said automatic locking system maintaining said locking of said printer access door if said sheet jam sensing system is indicating that there is a sheet jam in said internal printer paper path until said automatic locking system is actuated by entry of an authorized jam clearance access code.

2. The shared users printing and mailboxing system of claim 1, in which said electronic print jobs may be selectively electronically designated as secure print jobs, wherein said openable printer access door is only locked by said automatic locking system while said electronic print jobs are being printed when said electronic print jobs being printed are so designated as a secure print job.

3. The shared users printing and mailboxing system of claim 1, further including a hardcopy sheet distribution system between said printer and said array of lockable mailboxes, said hardcopy sheet distribution system having an access door, and further including a second automatic locking system for electronically locking said hardcopy sheet distribution system access door while said electronic print jobs are being printed until said hardcopies of said electronic print jobs have reached said selected mailboxes.

4. The shared users printing and mailboxing system of claim 1, wherein respective said users of said system have an assigned access code for said unlocking of said mailboxes for said hard copy print jobs of said user, and wherein said printer access door is automatically electronically unlocked by entry of said access code in said automatic locking system for said sheet jam clearance from said internal paper path of said printer.

* * * * *